Patented Dec. 22, 1942

2,306,352

UNITED STATES PATENT OFFICE 2,306,352

TALL OIL METAL COMPOUND AND PROCESS OF MAKING SAME

Harry Burrell, Newark, N. J., assignor to Ellis-Foster Company, a corporation of New Jersey No Drawing. Application December 16, 1939, Serial No. 309,701

1 Claim. (Cl. 260—97.5)

This invention relates to plastic products derived from the by-product of wood pulp manufacture known as "tall oil."

Tall oil is a dark brown, odorous, viscous liquid usually containing some suspended solid matter; it is of varied composition depending on the raw wood from which it is derived and on the exact pulping procedure. It is obtained from the black liquor of wood pulping processes and consists chiefly of resin acids, fatty acids, and unsaponifiable material (stated to be sterols).

I have found that this cheap, abundantly available material may be converted into plastic masses capable of hardening by heating, and which thus has utility in the wide field of allied plastic arts. Among the products which may be made from the tall oil material are coatings such as paints for concrete, road binding agents, roofing compounds, floor or wall tile, electrical insulation, rubber compounding materials, molding compositions particularly those for cold molding, linoleum, sheeting compounds, impregnated cloth, etc. The plastic may be combined with other ingredients, for instance fillers such as wood flour, asbestos, clay, mica, and the like, or it may be dissolved in benzene, petroleum distillate, etc., in the manner well known to the art.

The tall oil plastic is prepared by reacting the tall oil at elevated temperatures with metallic compounds, preferably compounds of heavy metals or alkaline earth metals. Oxides, hydroxides, chlorides, acetates, or carbonates are convenient compounds of the metals, and any metal may be used except those of group I in the periodic table. There are economic limitations which make it desirable to use such readily available compounds as white lead, red lead, litharge, lead peroxide, manganese dioxide, calcium oxide, ferric oxide, ferric carbonate, aluminum acetate, magnesium hydroxide, or calcium chloride.

The ratio of metal compound to be combined with the tall oil must be above a critical minimum. In order that this limitation may be expressed, it is convenient to consider the tall oil as a single monocarboxylic acid of molecular weight determined by the acid number, with the understanding that such a consideration is for purposes of computation only and does not represent the true nature of the tall oil. Hereinafter the expression "one equivalent of tall oil" is to be construed to mean that amount of tall oil equivalent to one atomic weight of hydrogen ion, as determined by the acid number. For example, if the acid number of a sample of tall oil is 168, this means that the average molecular weight of the material counted as monobasic acid is about 330. Considering the ingredients in this light, it may be stated that it is necessary in the present invention to react one equivalent of tall oil with at least one atomic weight of the heavy metal or alkaline earth metal (in compound form) regardless of the valence of the metal. Since the metals of these classes exist in a condition wherein the valence is greater than one this means that soaps of tall oil, which are, of course, known to the prior art, are not the reaction products resulting from the process of this invention. Soaps would be formed by reacting one equivalent of a metal (i. e. one atomic weight divided by the valence) with one equivalent of tall oil. Without exception among those metals tried, the soaps of tall oil were soft, sticky, gummy masses unsuited for the present purposes, whereas the adducts of at least one atomic weight of metal with one equivalent of tall oil were solids possessing highly desirable properties. As a general statement it may be said that the proportion of metallic compound necessary to use for each equivalent weight of tall oil is the molecular weight (M) of the compound divided by the number of atoms (a) of metal per molecule of the compound; that is, it is $M/a$. This amount is illustrated in the following, wherein is given the minimum amount $(M/a)$ of various metallic compounds required to form the hereindescribed products when combined with one equivalent of tall oil:

| | | |
|---|---|---|
| PbO | M=223 | M/a=223 |
| Pb$_3$O$_4$ | M=686 | M/a=229 |
| 2PbO·Pb(OH)$_2$ | M=776 | M/a=259 |
| Mg(OH)$_2$ | M=58.3 | M/a=58.3 |
| MnO$_2$ | M=86.9 | M/a=86.9 |

The exact nature of the tall oil-metal adducts has not been investigated but it may readily be seen that they are novel and utilitarian products.

The mode of formation of the tall oil plastics consists of heating an intimate mixture of tall oil or similar material and metal compound to an elevated temperature preferably not over 300° C. and conveniently at or less than 250° C. Heating should be continued long enough to form a product which is solid at room temperature and this ordinarily occurs in 15 minutes or less at 250° C. and frequently it is necessary only to heat the mixture up to this temperature. Lower temperatures require longer heating times but produce similar results. In certain cases it is desirable only to partially react the constituents at one stage and to complete the conversion in a later stage. Variations of the mode of heating are illustrated in the examples.

Part of the metal may be combined with the tall oil at lower temperatures if desired, for instance by the well known methods of soap formation, and then sufficient additional metal compound may be later reacted at elevated temperatures. Combinations of two or more metals may be used.

Various modifications of the invention will occur to those skilled in the art, and the following examples are illustrative only and should not be construed so as to limit the scope or proportions beyond the limits already described.

EXAMPLE 1

|  | Parts |
|---|---|
| Tall oil (acid number 181) | 60 |
| Red lead (Pb$_3$O$_4$) | 49 |
| Powdered mineral filler | 148 |
| Asbestos floats | 148 |

The ingredients were thoroughly mixed and partially reacted together by subjecting them to the action of a steam heated Banbury for 15 minutes. The product, which contained 15% tall oil, was a stiff plastic mass, substantially solid to the touch at room temperature. It remained sufficiently plastic, however, to form an excellent cold molding composition.

The granulated product was cold molded at 10 tons per square inch. The moldings were smooth surfaced, rigid and had excellent handling properties. They were baked in an oven at 80° C. for 16 hours, followed by 5 hours at 150° C.

The finished products were well formed, smooth, non-blistered, very hard, dense, strong, odorless moldings of light brown color. They showed an impact strength which was 44% higher than that possessed by a cold-molded piece made with the same proportion of a conventional binder consisting of gilsonite, stearin pitch and drying oil.

EXAMPLE 2

|  | Parts |
|---|---|
| Tall oil (acid number 181) | 60 |
| White lead (2PbCO$_3$·Pb(OH)$_2$) | 55 |
| Powdered mineral filler | 142 |
| Asbestos floats | 143 |

The ingredients were subjected to the action of a steam-heated Banbury mixer for 15 minutes. The product was a rather hard, but plastic mass which could be cold molded at 10 tons per square inch pressure to form easily handled molded pieces.

The moldings were baked according to the following heating schedule:

| Hours heated | Temperature |
|---|---|
|  | ° C. |
| 0 | 80 |
| 1 | 85 |
| 2 | 110 |
| 3 | 119 |
| 4 | 130 |
| 5 | 138 |
| 6 | 140 |
| 7 | 154 |
| 8 | 162 |
| 9 | 172 |
| 10 | 180 |
| 12 | 180 |
| 13½ | 182 |

The baked moldings were light grayish-brown colored, very hard and dense, substantially odorless, and strong.

EXAMPLE 3

|  | Parts |
|---|---|
| Tall oil (acid number 181) | 60 |
| Manganese dioxide | 55 |
| Powdered mineral filler | 142 |
| Asbestos floats | 143 |

The ingredients were treated by the procedure of Example 2, including the same baking schedule. The molded articles were black and very hard, dense, and strong.

EXAMPLE 4

|  | Parts |
|---|---|
| Tall oil (acid number 181) | 80 |
| Red lead (Pb$_3$O$_4$) | 65 |
| Powdered mica schist | 40 |
| Asbestos floats | 260 |

The ingredients were thoroughly mixed and partly reacted by mixing for 25 minutes in a Banbury machine which was heated by circulating steam through the jacket and rotors. The stiff, hot, plastic mass was then sheeted by passing between heated steel rolls. The resulting sheet was cured by baking for 24 hours at temperature slowly rising to 150° C. The product could be cut into geometrical shapes to serve as a brick red, glossy, hard floor tile.

EXAMPLE 5

|  | Parts |
|---|---|
| Tall oil (acid number 181) | 120 |
| Red lead (Pb$_3$O$_4$) | 97 |

The ingredients were stirred together and heated in an open vessel to 150° C. The viscous mass was cooled to 90° C. and spread on heavy canvas duck. The plastic was worked into the cloth by repeatedly passing through heated rolls, and then baked at 90° C. until tack-free. The product was a tough, waterproof, leather like sheet.

EXAMPLE 6

|  | Parts |
|---|---|
| Tall oil (acid number 161) | 50 |
| Red iron oxide | 40 |
| Red lead | 10 |
| Asbestos floats | 50 |
| Ground mineral filler | 200 |

The ingredients were mixed and partially reacted for 8 minutes in Banbury heated to 195° C. The product was cold molded at 7500 pounds per square inch. The flow was excellent, the moldings being slightly plastic but readily handleable. The moldings were baked at 150° C. for 16 hours; they were hard even when hot, the color was brick red, and the strength fair.

EXAMPLE 7

|  | Parts |
|---|---|
| Tall oil (acid number 161) | 50 |
| White lead | 50 |
| Cobalt oxide | 1 |
| Wood flour | 100 |

The ingredients were mixed and reacted together for 1 hour in a Banbury heated to 195° C. The product was cold molded at 5000 pounds per square inch, the moldings being firm and altogether handleable. They were baked at 110° C. for 16 hours followed by 10 hours at 150° C. The finished articles were dark brown, hard, unblistered, odorless, and strong.

EXAMPLE 8

|  | Parts |
|---|---|
| Ground cork | 50 |
| Tall oil | 50 |
| White lead | 50 |
| Cobalt oxide | 1 |

The ingredients were milled and reacted together for 30 minutes in the Banbury mixer which was heated at 170°–195° C. The hot mixture, which was soft and rubbery, was pressed into a large shallow tray to form a layer about one quarter inch thick. The layer was held under pressure of about 50 pounds per square inch for 15 minutes while cooling. The product was an elastic, resilient, tough, well bound, linoleum-like material of dark brown color and very slight odor. The surface had a slight initial tack which disappeared after standing 24 hours at room conditions. By passing the product through calendering rolls a few times the surface was smoothed and given a pleasant feel.

EXAMPLE 9

| | Parts |
|---|---|
| Tall oil (acid number 161) | 50 |
| White lead | 50 |
| Cobalt oxide | 1 |

The ingredients were mixed together and heated up to 250° C. Extensive foaming occurred in the initial stages of reaction, and the material became more viscous with continued heating. The resin was poured into a shallow pan and it hardened to a dark gray, brittle solid.

The resinous material was dissolved in 80 parts Varsol (petroleum distillate) and 88 parts benzene by heating. The viscosity of the solution was reduced by adding 10 parts ethanol. The spirit varnish was painted on a test strip of concrete flooring. The coating dried in 5 minutes to a slightly tacky film which was perfectly dry and odorless after 24 hours. After 2 months the coating showed very little wear in spite of heavy pedestrian traffic. The coating was also an effective dust layer.

EXAMPLE 10

Part A

| | Parts |
|---|---|
| Tall oil (one equivalent) | 20 |
| Pb₃O₄ (0.168 mol, or 0.503 atomic equivalent) | 6.6 |

The ingredients were mixed together and heated in an open vessel. When 180° C. was reached the color changed from red to dark brown and progressively darkened as the temperature was increased to 250° C. The melt showed no increase in viscosity and remained liquid after heating for 2 hours at 250° C. The cooled product was a black, soft, tacky mass of no value for the purposes herein contemplated.

Part B

| | Parts |
|---|---|
| Tall oil (one equivalent) | 20 |
| Red lead (0.255 mol or 0.768 atomic equivalent) | 10 |

The ingredients were heated as in part A. The same behavior was noted and the product was apparently identical.

Part C

| | Parts |
|---|---|
| Tall oil (one equivalent) | 20 |
| Red lead (0.356 mole or 1.06 atomic equivalents) | 14 |

The ingredients were mixed and heated together in an open vessel. At 110° C. considerable foaming occurred. At 180° C. a very slight darkening occurred but the distinctive red color persisted and did not darken as heating progressed. At 230° C. there was a rapid increase in viscosity and the temperature dropped to 210° C. As heating was continued to 250° C. a soft, stringy, unstirrable gel quickly formed which would not remelt.

The experiments immediately above indicate the minimum of metal compound required for the tall oil products of the present invention. Part A uses lead in proportion sufficient to form a soap. That is, tall oil is reacted with 1 chemical equivalent of lead (2 moles tall oil to 1 atomic weight of lead) to yield a soft, black, sticky mass. Part B uses a somewhat increased amount of red lead (2 moles tall oil to about 1½ atomic weights of lead) but without much change in the physical properties of the product. Part C uses the proportion of about 2 moles tall oil to 2 atomic weights of lead and shows distinctly the unexpected results obtained when 1 equivalent of tall oil is reacted with at least 1 atomic weight of a metal.

EXAMPLE 11

| | Parts |
|---|---|
| Tall oil (acid number 181) | 20 |
| Na₂CO₃ | 3 |

The ingredients were heated together to 130° C., when foaming had almost ceased. 100 parts water and 100 parts ethanol were then added. 9.5 parts PbAc₂·3H₂O, dissolved in 200 parts water were added to the sodium soap solution, a gummy lead soap precipitating. This was thoroughly washed with water and heated to 250° C. The cooled product was soft and tacky, strongly resembling the products of parts A and B of Example 10.

To the melt at 200° C. was added 9.5 parts PbAc₂·3H₂O which dissolved readily. The mixture was heated at 250° C. for 15 minutes. The cooled product was a rather hard, resinous solid.

In the above example an ordinary lead soap of tall oil was prepared and characterized. By heating this soap with an extra amount of a metal compound a new product is obtained.

EXAMPLE 12

| | Parts |
|---|---|
| Tall oil (acid number 181) | 150 |
| Red lead | 150 |

The ingredients were heated together in an open vessel up to 263° C. when gelation started. Heating was stopped and gelation spontaneously continued until a solid rubbery mass was obtained. 260 parts of this product were then milled on differential rolls with 26 g. gum rubber. The product was a brick red, stiffly plastic mass which possessed rubbery or elastic properties, and was very flexible in thin layers.

EXAMPLE 13

A large variety of compounds in addition to those of the preceding examples was reacted with tall oil according to the method of Example 10, parts A to C. The following table lists the compounds, the number of mols used for each equivalent of tall oil, and the physical condition of the product.

| Compound | Mols | Physical condition of cooled product |
|---|---|---|
| PbO | 0.50 | Soft and tacky. |
| PbO | 1.00 | Hard and brittle. |
| PbO₂ | 0.50 | Soft, tacky, plastic. |
| PbO₂ | 1.00 | Hard, black, brittle, resinous. |
| 2PbCO₃·Pb(OH)₂ | 0.272 | Tacky semi-solid. |
| 2PbCO₃·Pb(OH)₂ | 0.337 | Hard, brittle, non-tacky. |
| PbAc₂ | 0.50 | Soft semi-solid. |
| PbAc₂ | 1.00 | Hard, black, resinous. |
| MnAc₂·4H₂O | 0.50 | Soft semi-solid. |
| MnAc₂·4H₂O | 1.00 | Hard, black, brittle, friable. |
| MnAc₂·4H₂O | 3.00 | Brown, hard, strong. |
| MnO₂ | 1.01 | Slightly soft, tacky, black. |
| MnO₂ | 2.62 | Dark brown, hard, brittle, solid. |
| MnO₂ | 4.02 | Hard, black, resinous. |
| AlAc₂OH | 0.333 | Dark brown, soft, plastic. |
| AlAc₂OH | 1.06 | Brown, opaque, hard, brittle. |
| AlAc₂OH | 1.89 | Translucent, brittle, hard. |
| CaO | 0.50 | Liquid with white precipitate. |
| CaO | 1.00 | Light brown, friable solid. |
| Mg(OH)₂ | 4.01 | Black, brittle, fragile solid. |

From the examples it is evident that the reaction between an equivalent of tall oil and one atomic equivalent of a metal to yield solid, alkaliresistant, technically useful products of high softening point is quite a general one. Naturally, characteristic differences will occur in the products depending on the source of tall oil and the metal compound used. Certin minor anomalies which may be mentioned are the facts that some oxides such as $MnO_2$ or $Fe_2O_3$ react more slowly than other oxides or other compounds of the same metals; consequently it is advisable to increase the proportion of such metals to more than one atomic equivalent per equivalent of tall oil. When such addition is made it may be found in certain instances (notably with $MnO_2$, $PbO_2$ and PbO) that the hot adduct is less viscous or more mobile than a similar product resulting from the use of less of the metal compound; however, the cooled products are harder when more metal compound is used. Some compounds such as $Al_2O_3$ or $Al(OH)_3 \cdot xH_2O$ react so slowly with tall oil as to limit their usefulness. Tall oil adducts of such metals may be formed, however, by altering the anion constituent, and the acetate will frequently be found useful. Excessive heating of some adducts such as the calcium or antimony products is to be avoided as they are subject to decomposition, but generally the adducts are very stable.

What I claim is:

The reaction product of one equivalent weight of tall oil with at least one-third mole of red lead.

HARRY BURRELL.